United States Patent
Ryu et al.

(10) Patent No.: US 9,528,457 B2
(45) Date of Patent: Dec. 27, 2016

(54) CONTROL METHOD FOR EXHAUST GAS RECIRCULATION OF HYBRID ELECTRIC VEHICLE

(71) Applicant: HYUNDAI MOTOR COMPANY, Seoul (KR)

(72) Inventors: In Sang Ryu, Incheon (KR); Ingee Suh, Yongin-si (KR); Kyoung Pyo Ha, Seongnam-si (KR); Back Sik Kim, Osan-si (KR); Kiyoung Kwon, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/853,536

(22) Filed: Sep. 14, 2015

(65) Prior Publication Data

US 2016/0153377 A1 Jun. 2, 2016

(30) Foreign Application Priority Data

Dec. 2, 2014 (KR) .................. 10-2014-0170348

(51) Int. Cl.
   F02D 41/00 (2006.01)
   B60K 6/24 (2007.10)
   F02D 29/02 (2006.01)

(52) U.S. Cl.
   CPC ............ F02D 41/0077 (2013.01); B60K 6/24 (2013.01); F02D 29/02 (2013.01); F02D 41/005 (2013.01); F02D 41/0052 (2013.01); F02D 41/0065 (2013.01); B60L 2240/441 (2013.01); B60L 2240/443 (2013.01); F02D 2041/0017 (2013.01)

(58) Field of Classification Search
   CPC .... F02D 41/0077; F02D 41/0065; B60K 6/24; B60L 2240/441; B60L 2240/443
   See application file for complete search history.

(56) References Cited

U.S. PATENT DOCUMENTS

| 8,483,934 B2* | 7/2013 | Cunningham | F02D 37/02 123/520 |
| 8,744,726 B2* | 6/2014 | Cunningham | F02D 37/02 123/520 |
| 2007/0233332 A1* | 10/2007 | Kawada | B60K 6/365 701/13 |

(Continued)

FOREIGN PATENT DOCUMENTS

| JP | 2010-120472 A | 6/2010 |
| JP | 2010-127134 A | 6/2010 |

(Continued)

*Primary Examiner* — Russell Frejd
(74) *Attorney, Agent, or Firm* — McDermott Will & Emery LLP

(57) ABSTRACT

A control method for exhaust gas recirculation of a hybrid electric vehicle includes detecting a pressure of an intake manifold. A difference between the pressure of the intake manifold and atmospheric pressure is determined. A load of an engine, which generates torque by combusting a fuel and external air supplied through the intake manifold, is determined. An opening rate of an exhaust gas recirculation valve is controlled to be a first value according to a rotational speed of the engine when the difference is smaller than or equal to a reference pressure and the load of the engine is smaller than or equal to a reference load.

11 Claims, 5 Drawing Sheets

(56) References Cited

U.S. PATENT DOCUMENTS

| | | | | |
|---|---|---|---|---|
| 2013/0110383 A1* | 5/2013 | Mc Donald | ........... | F02D 41/042 701/113 |
| 2013/0284155 A1* | 10/2013 | Cunningham | .......... | F02D 37/02 123/520 |
| 2014/0053551 A1* | 2/2014 | Pursifull | ............. | F02D 13/0249 60/602 |
| 2014/0251285 A1* | 9/2014 | Surnilla | .................. | F02B 47/08 123/520 |

FOREIGN PATENT DOCUMENTS

| | | |
|---|---|---|
| JP | 2010-163965 A | 7/2010 |
| JP | 5034849 B2 | 9/2012 |
| JP | 5045689 B2 | 10/2012 |
| JP | 5632223 B2 | 11/2014 |
| KR | 10-1406636 B1 | 6/2014 |

\* cited by examiner

-- Related Art --

CONTROL METHOD FOR EXHAUST GAS RECIRCULATION OF HYBRID ELECTRIC VEHICLE

CROSS-REFERENCE TO RELATED APPLICATION

This application claims the benefit of priority to Korean Patent Application No. 10-2014-0170348 filed in the Korean Intellectual Property Office on Dec. 2, 2014, the entire content of which is incorporated herein by reference.

TECHNICAL FIELD

The present disclosure relates to a control method for exhaust gas recirculation of a hybrid electric vehicle. More particularly, the present disclosure relates to a control method for exhaust gas recirculation of a hybrid electric vehicle that stably controls an exhaust gas recirculation (EGR) valve even though a pressure of an intake manifold increases.

BACKGROUND

A hybrid electric vehicle uses two or more different kinds of power sources, which are an engine that obtains a driving torque by burning fuel and a motor that obtains a driving torque with battery power.

The hybrid electric vehicle can provide optimum output torque, depending on how the engine and the motor operate while the vehicle is driven by the two power sources, that is, the engine and the motor.

The hybrid electric vehicle has an exhaust gas recirculation (EGR) system that recirculates exhaust gas into a combustion chamber to reduce fuel consumption.

The hybrid electric vehicle controls a brake mean effective pressure of the engine as a high level to improve fuel efficiency, and applies an Atkinson cycle to intake and compression processes. Thus, a pressure of an intake manifold may be controlled as a high level compared to a general engine vehicle.

In addition, when the exhaust gas is recirculated from an exhaust line to an intake line, a throttle valve can be opened even more due to inflow of fresh air, thereby the pressure of the intake manifold may be increased more.

Therefore, a pressure difference between a front side and a rear side of the exhaust gas recirculation valve is generated, such that stability of controlling an opening of the exhaust gas recirculation valve may be decreased.

Further, when the EGR valve is closed to solve the above problems, fuel consumption may increase and quality of exhaust gas may be deteriorated.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a control method for exhaust gas recirculation of a hybrid electric vehicle having advantages of controlling an exhaust gas recirculation (EGR) valve even though a pressure of an intake manifold increases.

According to an exemplary embodiment of the present inventive concept, a control method for exhaust gas recirculation of a hybrid electric vehicle includes detecting a pressure of an intake manifold. A difference between the pressure of the intake manifold and atmospheric pressure is determined. A load of an engine, which generates torque by combusting a fuel and external air supplied through the intake manifold, is determined. An opening rate of an exhaust gas recirculation valve is controlled to be a first value according to a rotational speed of the engine when the difference is smaller than or equal to a reference pressure and the load of the engine is smaller than or equal to a reference load.

The method may further include controlling the opening rate of the exhaust gas recirculation valve to be 0 when the difference is smaller than or equal to the reference pressure and the load of the engine is greater than the reference load.

The method may further include controlling the opening rate of the exhaust gas recirculation valve to be a second value according to a flux of the exhaust gas recirculation valve when the difference is greater than the reference pressure.

The load of the engine is determined by subtracting a load of a motor from a total load.

An opening timing of intake and exhaust valves of the engine is determined according to the rotational speed of the engine.

An ignition timing of the engine is determined according to the opening rate of the exhaust gas recirculation valve.

An opening timing of intake and exhaust valves of the engine is determined according to a maximum load of the engine.

An ignition timing of the engine is determined under a condition where the opening rate of the exhaust gas recirculation valve is 0.

As described above, according to the exemplary embodiment of the present inventive concept, the EGR valve can be controlled as a predetermined opening rate in accordance with a rotational speed of the engine when the pressure of the intake manifold is greater than a predetermined pressure, so that oscillation of the EGR valve due to a pressure change of the intake manifold may be prevented.

In addition, exhaust gas is recirculated by an operation of the EGR valve under a high load condition, so fuel efficiency of the hybrid electric vehicle may be improved.

DETAILED DESCRIPTION OF THE EMBODIMENTS

Figure 1:
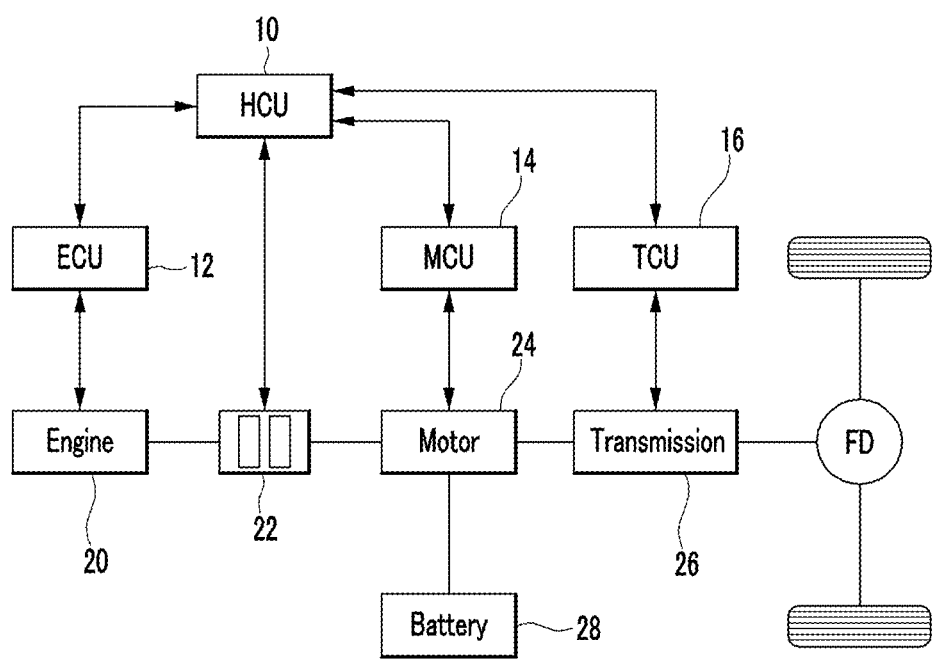
FIG. 1 is a schematic diagram of a hybrid system to which a control method for exhaust gas recirculation of a hybrid electric vehicle is applied according to an exemplary embodiment of the present inventive concept.

In the following detailed description, only certain exemplary embodiments of the present inventive concept have been shown and described, simply by way of illustration. As those skilled in the art would realize, the described embodiments may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

Like reference numerals designate like elements throughout the specification.

It is understood that the term "vehicle", "vehicular", or other similar terms as used herein is inclusive of motor vehicles in general, including hybrid vehicles, plug-in hybrid electric vehicles, and other alternative fuel vehicles (e.g., using fuels derived from resources other than petroleum). As referred to herein, a hybrid electric vehicle is a vehicle that has two or more sources of power, for example a vehicle that is both gasoline powered and electricity powered.

Additionally, it is understood that some of the methods may be executed by at least one controller. The term "controller" refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROM, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

An exemplary embodiment of the present inventive concept will hereinafter be described in detail with reference to the accompanying drawings.

FIG. 1 is a schematic diagram of a hybrid system to which a control method for exhaust gas recirculation of a hybrid electric vehicle is applied according to an exemplary embodiment of the present inventive concept.

The hybrid system as shown in FIG. 1 is an exemplary embodiment of the present inventive concept for better comprehension and ease of description. Therefore, a control method for exhaust gas recirculation of a hybrid electric vehicle according to an exemplary embodiment of the present inventive concept may not only be applied to the hybrid system as shown in FIG. 1, but may also be applied to all other hybrid systems.

As shown in FIG. 1, the hybrid system to which a method for controlling torque reduction of a hybrid electric vehicle is applied according to an exemplary embodiment of the present inventive concept includes a hybrid control unit (HCU) 10, an electronic control unit (ECU) 12, a motor control unit (MCU) 14, a transmission control unit (TCU) 16, an engine 20, an engine clutch 22, a motor 24, a transmission 26, and a battery 28.

The HCU 10 controls operation of other controllers which mutually exchange information in an entire operation of a hybrid electric vehicle, so that the HCU 10 controls an output torque of the engine 20 and the motor 24 by cooperating with other controllers.

The ECU 12 controls an entire operation of the engine 20 according to conditions of the engine 20, such as a demand torque of a driver, a coolant temperature, and an engine torque.

The MCU 14 controls an entire operation of the motor 24 according to a demand torque of a driver, a driving mode of the hybrid electric vehicle, and an SOC condition of the battery 28.

The TCU 16 controls an entire operation of the transmission 26 such as speed ratios of the transmission 26 depending on output torque of the engine 20 and the motor 24, and an amount of regenerative braking.

The engine 20 outputs power as a power source while running.

The engine clutch 22 is disposed between the engine 20 and the motor 24 to receive a control signal of the HCU 10, and selectively connects the engine 20 and the motor 24 according to a driving mode of the hybrid electric vehicle.

The motor 24 operates by a 3-phase AC voltage applied from the battery 28 through an inverter to generate torque, and operates as a power generator and supplies regenerative energy to the battery 28 in a coast-down mode.

The transmission 26 supplies a sum of an output torque of the engine 20 and an output torque of the motor 24 determined by coupling and releasing of the engine clutch 22 as an input torque, and selects a shift gear according to a vehicle speed and a driving condition to output driving force to a driving wheel and maintain driving.

The battery 28 is composed of a plurality of unit cells, and stores a high voltage for supplying a voltage to the motor 24, for example, 400 V to 450 V DC.

The battery 28 supplies a voltage to the motor 24 for supporting power output from the engine 20 in an HEV mode or provides driving force in an EV mode, and is charged by regenerative braking energy.

The hybrid system as described above is obvious to a person of ordinary skill in the art, so that a detailed explanation thereof will be omitted.

Figure 2:
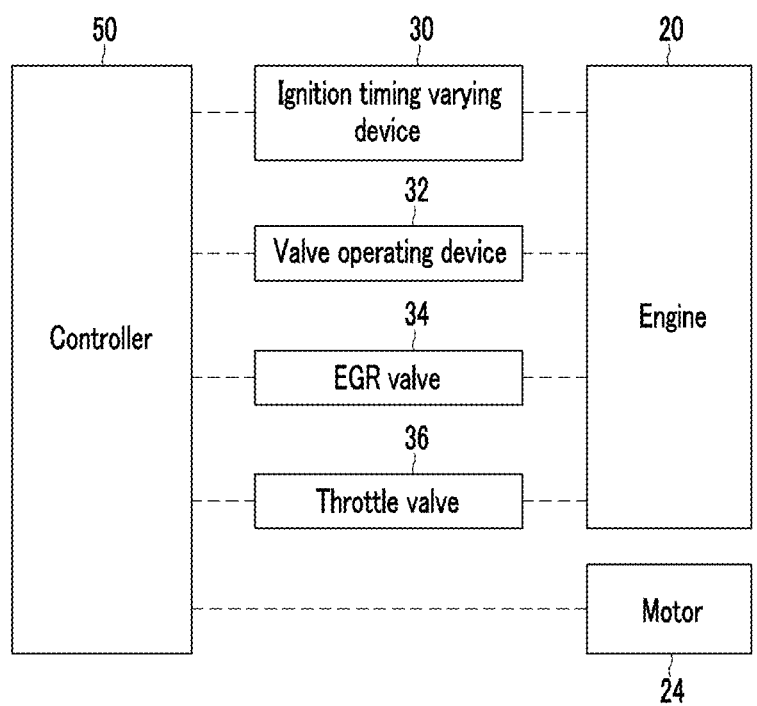
FIG. 2 is a schematic block diagram showing a system for exhaust gas recirculation of a hybrid electric vehicle according to an exemplary embodiment of the present inventive concept.

FIG. 2 is a schematic block diagram showing a system for exhaust gas recirculation of a hybrid electric vehicle according to an exemplary embodiment of the present inventive concept.

As shown in FIG. 2, a system for exhaust gas recirculation of a hybrid electric vehicle according to an exemplary embodiment of the present inventive concept includes an engine 20, a motor 24, an ignition timing varying device 30, a valve operating device 32, an exhaust gas recirculation valve 34, a throttle valve 36, and a controller 50.

The ignition timing varying device 30 varies ignition timing of the engine 20 according to a state of the engine 20, and the valve operating device 32 controls an intake valve and an exhaust valve by advancing or retarding rotation of a camshaft according to a state of the engine 20.

The exhaust gas recirculation valve 34 controls a flow of exhaust gas recirculated from an exhaust line to an intake line, and the throttle valve 36 controls an air amount supplied to the engine 20.

The controller 50 controls the ignition timing varying device 30, the valve operating device 32, the exhaust gas recirculation valve 34, the throttle valve 36, the engine 20, and the motor 24.

That is, the controller 50 may perform a control method for exhaust gas recirculation of a hybrid vehicle according to the present disclosure to be described later through cooperation control between several controllers that are provided in the hybrid vehicle. For example, a hybrid control unit (HCU), which is a top superordinate controller, an engine control unit (ECU) that controls an entire engine operation, and a motor control unit (MCU) that controls an entire operation of a drive motor may be used. Therefore, for convenience of description, in the present specification and claims, several controllers that are provided in a hybrid vehicle are referred to as a controller 50.

For such an object, the controller 50 may be implemented with at least one microprocessor operating by a predetermined program, and the predetermined program may be programmed to perform each step of a control method for exhaust gas recirculation of a hybrid vehicle according to an exemplary embodiment of the present inventive concept.

Hereinafter, a control method for exhaust gas recirculation of the hybrid electric vehicle according to an exemplary embodiment of the present inventive concept will be described in detail with reference to FIGS. 3 to 5.

Figure 3:
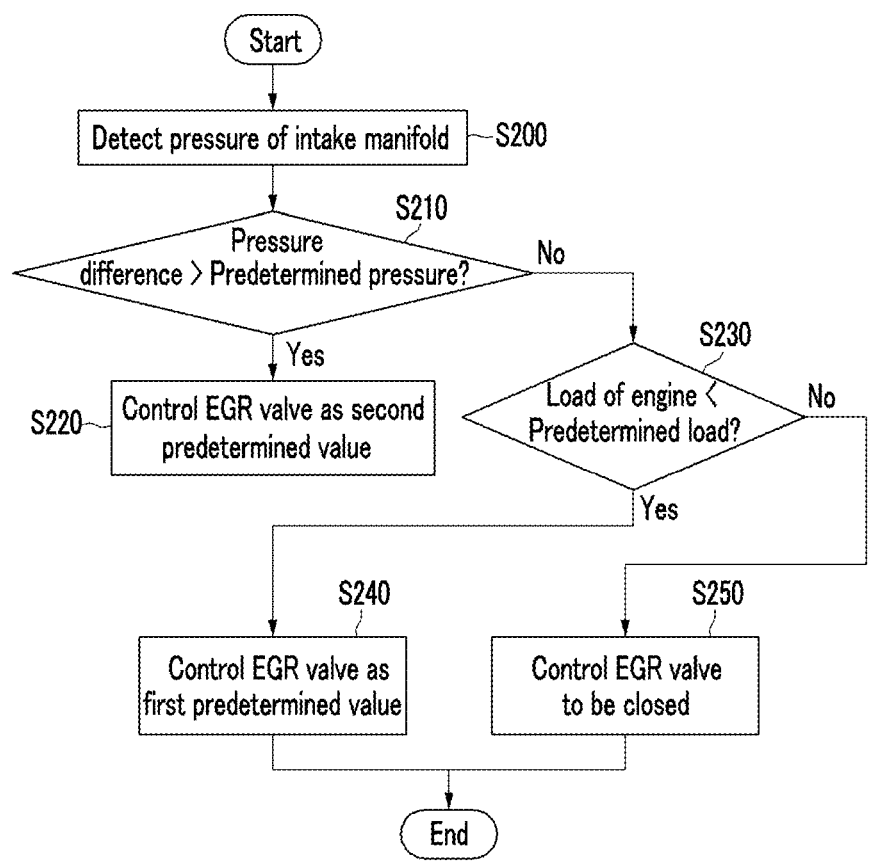
FIG. 3 is a flowchart showing a control method for exhaust gas recirculation of a hybrid electric vehicle according to an exemplary embodiment of the present inventive concept.

FIG. 3 is a flowchart showing a control method for exhaust gas recirculation of a hybrid electric vehicle according to an exemplary embodiment of the present inventive concept.

As shown in FIG. 3, a control method for exhaust gas recirculation of a hybrid electric vehicle according to an exemplary embodiment of the present inventive concept starts with detecting a pressure of the intake manifold at step S200.

The intake manifold is disposed at an intake side of the engine 20, so one side of the intake manifold receives external air, and another side of the intake manifold is connected to a combustion chamber. Generally, pressure of the intake manifold is lower than atmospheric pressure because of an operation of sucking the external air.

However, when an Atkinson cycle is applied in a compression process and closing timing of the intake valve is delayed, the pressure of the intake manifold may increase.

Therefore, exhaust gas which recirculates toward the intake manifold through the exhaust gas recirculation valve may be irregularly supplied. The pressure of the intake manifold may be detected by a pressure sensor or selected from predetermined map data according to the running state.

When the pressure of the intake manifold is detected at step S200, the controller 50 determines a difference between the pressure of the intake manifold and atmospheric pressure and compares the difference with a reference pressure at step S210.

When the difference is greater than the reference pressure at step S210, the controller 50 controls opening of the exhaust gas recirculation valve 34 as a second value according to a flux of the exhaust gas recirculation valve 34 at step S220.

In the exemplary embodiment of the present inventive concept, the controller 50 determines a valid cross-sectional area of the exhaust gas recirculation valve 34 by using a flux of recirculated exhaust gas, a pressure of a front side of the exhaust gas recirculation valve 34, a temperature at the front side of the exhaust gas recirculation valve 34, and a pressure ratio between a front side and a rear side of the exhaust gas recirculation valve 34, and controls an opening rate of the exhaust gas recirculation valve based on the valid cross-sectional area of the EGR valve 34.

In addition, an opening timing of intake and exhaust valves of the engine 20 may be determined according to the flux of recirculated exhaust gas with reference to a state where the flux of recirculated exhaust gas is 0.

Further, ignition timing may be determined according to the flux of recirculated exhaust gas.

When the difference is smaller than or equal to the reference pressure at step S210, the controller 50 compares a load of the engine with a reference load at step S230.

The load of the engine may be determined on the basis of a position value of an accelerator pedal of the hybrid electric vehicle.

When the load of the engine is smaller than the reference load at the step S230, the controller 50 controls the opening rate of the exhaust gas recirculation valve 34 as a first value at step S240.

In other words, the controller 50 controls the opening rate of the exhaust gas recirculation valve 34 as a fixed value corresponding to a rotational speed of the engine 20.

In addition, opening timing of intake and exhaust valves of the engine 20 may be determined according to the rotational speed of the engine 20, and ignition timing of the engine may be determined according to the opening rate of the exhaust gas recirculation valve.

Contrary to this, when the load of the engine is greater than or equal to the reference load at the step S230, the controller 50 controls the exhaust gas recirculation valve 34 to be closed at step S240. That is, the controller 50 controls the opening of the exhaust gas recirculation valve 34 as 0.

In addition, an opening timing of intake and exhaust valves of the engine 20 may be determined according to a maximum load of the engine 20, and ignition timing may be determined according to a maximum load of the engine 20.

The controller 50 may calculate the flux of exhaust gas recirculation by using the following equation.

Flux of EGR=$f$(valid cross-sectional area of the EGR valve,pressure of front side of the EGR valve,temperature of front side of the EGR valve,pressure ratio between front side and rear side of the EGR valve)

In other words, the flux of exhaust gas recirculation may be calculated by a function using a valid cross-sectional area of the EGR valve, a pressure of the front side of the EGR valve, a temperature of the front side of the EGR valve, and a pressure ratio between the front side and the rear side of the EGR valve.

Figure 4:
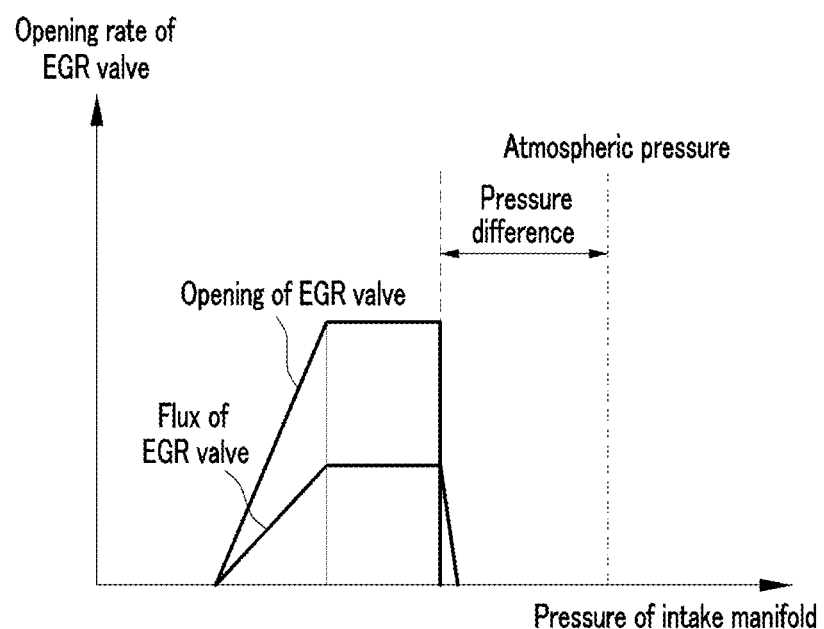
FIG. 4 is a graph showing a relation between a pressure of an intake manifold and an opening rate of an EGR valve according to a conventional art.
Figure 5:
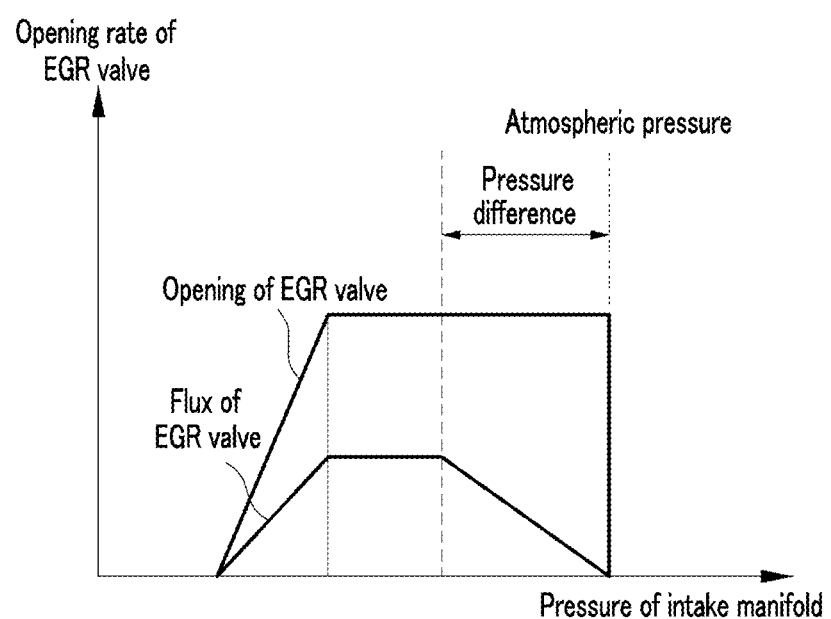
FIG. 5 is a graph showing a relation between a pressure of an intake manifold and an opening rate of an EGR valve according to an exemplary embodiment of the present inventive concept.

FIG. 4 is a graph showing a relation between a pressure of an intake manifold and an opening rate of an EGR valve according to a conventional art, and FIG. 5 is a graph showing a relation between a pressure of an intake manifold and an opening rate of an EGR valve according to an exemplary embodiment of the present inventive concept.

In the FIGS. 4 and 5, a horizontal axis represents a pressure of the intake manifold, and a vertical axis represents an opening rate of the EGR valve.

As shown in FIG. 4, according to the conventional art, an opening rate of the EGR valve is controlled to be 0 when the pressure of the intake manifold is increased and a difference between the pressure of the intake manifold and atmospheric pressure is smaller than a reference value.

Therefore, fuel consumption may be increased and quality of exhaust gas may be deteriorated.

On the other hand, as shown in FIG. 5, the controller 50 according to an exemplary embodiment of the present inventive concept controls an opening rate of the EGR valve 34 as a set value when the difference between the pressure of the intake manifold and the atmospheric pressure is greater than a reference value.

Therefore, exhaust gas can be stably recirculated, thereby fuel efficiency and quality of exhaust gas of the hybrid electric vehicle may be improved.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A control method for exhaust gas recirculation of a hybrid electric vehicle, comprising:
    detecting a pressure of an intake manifold;
    determining a difference between the pressure of the intake manifold and atmospheric pressure;
    determining a load of an engine which generates torque by combusting a fuel and external air supplied through the intake manifold;
    controlling an opening rate of an exhaust gas recirculation valve to be a first value according to a rotational speed of the engine when the difference is smaller than or equal to a reference pressure and the load of the engine is smaller than or equal to a reference load; and
    controlling the opening rate of the exhaust gas recirculation valve to be 0 when the difference is smaller than or equal to the reference pressure and the load of the engine is greater than the reference load.

2. The control method of claim 1, wherein an opening timing of intake and exhaust valves of the engine is determined according to the rotational speed of the engine.

3. The control method of claim 1, wherein an ignition timing of the engine is determined according to the opening rate of the exhaust gas recirculation valve.

4. The control method of claim 1, wherein an opening timing of intake and exhaust valves of the engine is determined according to a maximum load of the engine.

5. The control method of claim 1, wherein an ignition timing of the engine is determined under a condition where the opening rate of the exhaust gas recirculation valve is 0.

6. A control method for exhaust gas recirculation of a hybrid electric vehicle, comprising:
    detecting a pressure of an intake manifold;
    determining a difference between the pressure of the intake manifold and atmospheric pressure;
    determining a load of an engine which generates torque by combusting a fuel and external air supplied through the intake manifold;
    controlling an opening rate of an exhaust gas recirculation valve to be a first value according to a rotational speed of the engine when the difference is smaller than or equal to a reference pressure and the load of the engine is smaller than or equal to a reference load; and
    controlling the opening rate of the exhaust gas recirculation valve to be a second value according to a flux of the exhaust gas recirculation valve when the difference is greater than the reference pressure.

7. The control method of claim 6, wherein an opening timing of intake and exhaust valves of the engine is determined according to the rotational speed of the engine.

8. The control method of claim 6, wherein an ignition timing of the engine is determined according to the opening rate of the exhaust gas recirculation valve.

9. A control method for exhaust gas recirculation of a hybrid electric vehicle, comprising:
    detecting a pressure of an intake manifold;
    determining a difference between the pressure of the intake manifold and atmospheric pressure;
    determining a load of an engine which generates torque by combusting a fuel and external air supplied through the intake manifold;
    controlling an opening rate of an exhaust gas recirculation valve to be a first value according to a rotational speed of the engine when the difference is smaller than or equal to a reference pressure and the load of the engine is smaller than or equal to a reference load,
    wherein the load of the engine is determined by subtracting a load of a motor from a total load.

10. The control method of claim 9, wherein an opening timing of intake and exhaust valves of the engine is determined according to the rotational speed of the engine.

11. The control method of claim 9, wherein an ignition timing of the engine is determined according to the opening rate of the exhaust gas recirculation valve.

* * * * *